(12) United States Patent
Yost

(10) Patent No.: US 11,074,403 B1
(45) Date of Patent: Jul. 27, 2021

(54) COMPUTER SYSTEM THAT CAN MAKE A FIRST SPREADSHEET CELL BEHAVE SIMILARLY TO A SECOND CELL BY INDIRECTION THROUGH A "DITTO" FUNCTION

(71) Applicant: David Arthur Yost, Los Altos, CA (US)

(72) Inventor: David Arthur Yost, Los Altos, CA (US)

(*) Notice: Subject to any disclaimer, the term of this patent is extended or adjusted under 35 U.S.C. 154(b) by 0 days.

(21) Appl. No.: 16/908,636

(22) Filed: Jun. 22, 2020

Related U.S. Application Data

(60) Provisional application No. 62/865,171, filed on Jun. 22, 2019.

(51) Int. Cl.
| | | |
|---|---|---|
| *G06F 40/18* | (2020.01) | |
| *G06F 40/103* | (2020.01) | |
| *G06F 3/0484* | (2013.01) | |
| *G06F 3/0482* | (2013.01) | |
| *G06F 40/14* | (2020.01) | |

(52) U.S. Cl.
CPC .......... *G06F 40/18* (2020.01); *G06F 3/0482* (2013.01); *G06F 3/04842* (2013.01); *G06F 40/103* (2020.01); *G06F 40/14* (2020.01)

(58) Field of Classification Search
CPC ...... G06F 40/18; G06F 3/04842; G06F 40/14; G06F 3/0482; G06F 40/103
See application file for complete search history.

(56) References Cited

U.S. PATENT DOCUMENTS

2019/0340219 A1\* 11/2019 Schoedl .................. G06F 40/18

\* cited by examiner

*Primary Examiner* — Keith D Bloomquist
(74) *Attorney, Agent, or Firm* — Appleton Luff

(57) ABSTRACT

A computer system executes a spreadsheet application that accepts inputs from a user into a second cell of the spreadsheet document to reproduce a formula existing in a first cell of the spreadsheet. The formula references a first set for reference cells comprising one or more other cells in the spreadsheet document. Each of the one or more other cells in the spreadsheet document is positioned a relative distance from the first cell. The spreadsheet application reproduces the formula in the second cell while maintaining a link to cause any update of the formula in the first cell to be reflected in the second cell, and updates the formula in the second cell to generate a second set of reference cells wherein each cell in the second set of reference cells has a relative distance to the second cell that is equal to the relative distance of a corresponding cell in the first set of reference cells with respect to the first cell.

20 Claims, 6 Drawing Sheets

|   | A | B | C |
|---|---|---|---|
| 1 | 100 | 1 | 2 |
| 2 | 10 | =$A$1+$A2+B1 | =$A$1+$A2+C1 |
| 3 | 20 | =$A$1+$A3+B2 | =$A$1+$A3+C2 |

|   | A | B | C |
|---|---|---|---|
| 1 | 100 | 1 | 2 |
| 2 | 10 | 111 | 112 |
| 3 | 20 | 231 | 232 |

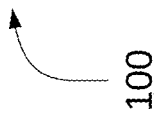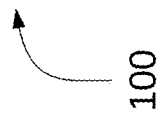

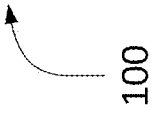
FIG. 3A
FIG. 3B

US 11,074,403 B1

COMPUTER SYSTEM THAT CAN MAKE A FIRST SPREADSHEET CELL BEHAVE SIMILARLY TO A SECOND CELL BY INDIRECTION THROUGH A "DITTO" FUNCTION

RELATED APPLICATIONS

This application claims priority to U.S. provisional patent application 62/865,171 filed on Jun. 22, 2019.

FIELD OF THE DISCLOSURE

This disclosure relates generally to computerized information systems and more particularly to computerized spreadsheet operations.

BACKGROUND

A spreadsheet application is a computer application employed to organize, analyze and store data in tabular form. The data manipulated by a spreadsheet is typically stored in a document ("a spreadsheet document") which typically takes the form of one or more "sheets", with each sheet being a grid of cells, where each cell has a position identified by column and row. A cell can take the form of a data cell whose value is a data item, such as a number or string, contained in the cell. A cell can also take the form of a formula cell whose value is the result of computing a formula contained in the cell. Users of spreadsheets often reproduce formulas in spreadsheets by performing a copy and paste operation to copy a formula in a first cell to one or more other cells. This copy and paste operation can be problematic as it does not always behave as a user would expect. The result is errors in the spreadsheet and additional time and effort by the user in generating a spreadsheet with the desired functions.

SUMMARY

Disclosed herein is a computer system that provides to a user a spreadsheet application capable of performing a "ditto" function as further described herein. The disclosed spreadsheet application accepts from a user an input to a second cell of a spreadsheet document to reproduce a formula existing in a first cell of the spreadsheet. The formula references a first set of referenced cells that comprise one or more other cells in the spreadsheet document. Each of the one or more other cells in the spreadsheet document is positioned at a relative distance from the first cell. The spreadsheet application operates to reproduce the formula in the second cell by generating a second set of referenced cells wherein a relative distance from the second cell to each referenced cell in the second set of referenced cells is equal to the relative distance from the first cell to a corresponding referenced cell in the first set of referenced cells.

The foregoing provides a number of advantages over conventional computerized spreadsheet applications. For example, after a user changes a formula cell used by other cells, cell copying is unnecessary, so there is nothing more that the user must remember to do. As cell copying is unnecessary, the user cannot accidentally copy the formula cell to too few cells within a formula block or cannot accidentally copy the formula cell to cells outside the formula block. To see if all formulas within a set of formula cells are isomorphic, a user can quickly and easily verify visually that all ditto cells are the same because they all have the same cell reference argument.

Additional aspects related to the invention will be set forth in part in the description that follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques. Elements designated with reference numbers ending in a suffix such as .1, .2, .3 are referred to collectively by employing the main reference number without the suffix. Specifically:

FIG. 2A shows a spreadsheet document in formula view.

FIG. 2B shows a spreadsheet document in values view.

FIG. 2C shows in a spreadsheet document a ditto formula block.

FIG. 2D shows in a spreadsheet document a ditto formula block that uses cell naming.

FIG. 3A shows in a spreadsheet document a formulas view mode with highlighting.

FIG. 3B shows in a spreadsheet document a values view mode with highlighting.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
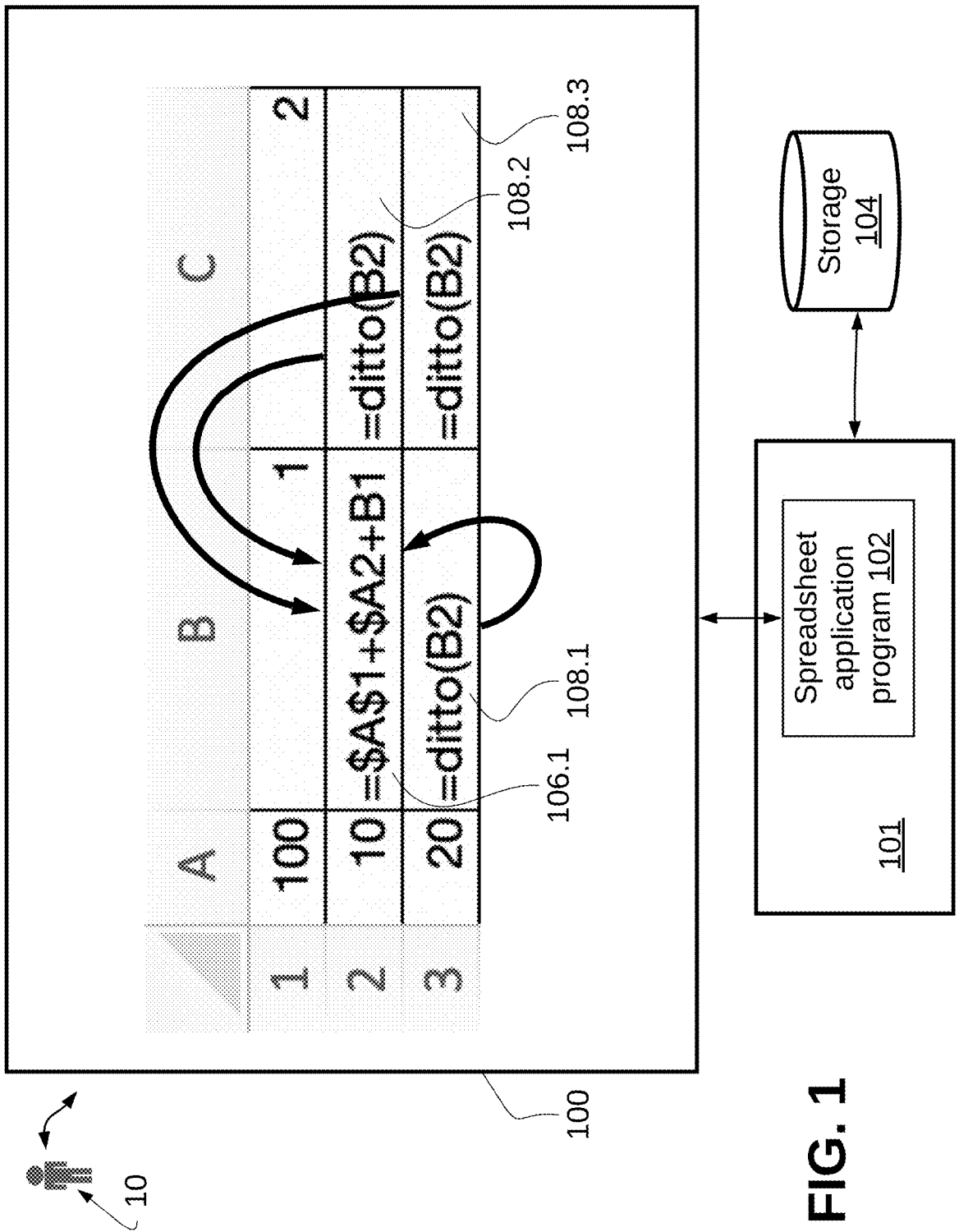
FIG. 1 shows a spreadsheet document with a ditto function as disclosed herein.

FIG. 1 shows a spreadsheet document 100 with a ditto function as disclosed herein. In FIG. 1, a user 10 interacts with a computer system 101 by way of a conventional user interface with includes a display to provide visual output to the user 10 and one or more input devices such as a keyboard and a pointing device to receive inputs from the user 10. For simplicity of illustration the display and input devices are not shown in FIG. 1. The computer system 101 executes a spreadsheet application program 102 which manipulates the spreadsheet document 100 in accordance with inputs by user 10. The computer system 101 includes storage 104 which may take a conventional form. 100A conventional spreadsheet application program permits a user to organize, analyze and store data in tabular form. In the embodiments disclosed herein, the disclosed computerized system and method employs spreadsheet application program 102 encoded with instructions that permit usage by user 10 of the ditto function, further described herein. In FIG. 1, the spreadsheet application program 102 permits entry of a formula such a shown at 106.1 in cell B2. Other cells such as cells B3, C2 and C3, seen at 108.1, 108.2 and 108.3 respectively, reference cell B2 by use of a ditto function as further described herein. The system 101 on which the spreadsheet application 102 executes may take the form of a desktop/laptop computer or other computing device, such as a tablet or mobile phone, located proximate to the user 10, on which the spreadsheet application 102 is loaded. Alternatively, the system 101 may be remotely located from the user 10 and be accessed by a computing device located proximate to the user 10. The storage 104 may also be located proximately to the user 10 or may be located remotely from the user 10.

Before describing the disclosed embodiments, it is useful to provide a description of certain terminology referred to in this specification.

A spreadsheet cell may contain only data or may contain a formula which performs some computation and may make reference to one or more other cells for data by column and row location in the grid.

A cell reference has a column component and a row component. For example, in the cell reference naming convention used in this description, the reference B3 references column B, row 3, and column B is another way of naming column 2.

In the cell reference naming convention used in this description, a cell reference component preceded by a dollar sign ($) signifies an absolute cell reference component; a cell reference component not preceded by a $ is a relative cell reference component. The four absolute-vs-relative cases for a cell reference are as follows:

B3—column component is relative; row component is relative $B3—column component is absolute; row component is relative B$3—column component is relative; row component is absolute $B$3—column component is absolute; row component is absolute A conventional spreadsheet application permits a user to a source formula cell, for example cell B2 in FIG. 2A, to one or more destination cells, for example to cells B3, C2, C3 in FIG. 2A. The system allows a user to perform a transposing copy, which causes the destination formula cell to be a transposed copy such that the destination formula cell is isomorphic to the source formula cell.

A first formula cell is isomorphic to a second formula cell
  a. if all of the cell references in the first formula cell are isomorphic to corresponding cell references in the second formula cell, and
  b. there are no other differences between the first and second formula cells.

A cell reference x is isomorphic to a cell reference y if
  a. the column component of cell reference x is isomorphic to the column component of cell reference y, and
  b. the row component of cell reference x is isomorphic to the row component of cell reference y.

The column component of a cell reference x can be isomorphic to the column component of a cell reference y in one of two ways:
  1. the column components of both cell references x and y are relative and the two reference distances are equal. For example:
     a. a formula in cell C2 contains an argument that references cell A2; C is a name for column 3 and A is a name for column 1; 3−1=2, so the column distance is 2;
     b. a formula in cell D2 contains an argument that references cell B2; D is a name for column 4 and B is a name for column 2; 4−2=2, so the column distance is 2;
  thus, the column component of the reference A2 in cell C2 is isomorphic to the column component of the reference to B2 in cell D2.
  2. the column components of both cell references x and y are absolute and their cell reference column components are equal. For example:
     a. cell E2 contains an argument that references cell $A2, with column component $A;
     b. cell E3 contains an argument that references cell $A3, with column component $A;
  thus, the column components of the references in cells C2 and D2 are isomorphic.

A row component of a cell reference x can be isomorphic to the row component of a cell reference y in one of two ways:
  1. the row components of both cell references x and y are relative and the two reference distances are equal. For example:
     a. a formula in cell B3 contains an argument that references cell B1; 3−1=2, so the row distance is 2;
     b. a formula in cell B4 contains an argument that references cell B2; 4−2=2, so the row distance is 2;
  thus, the row components of the references in cells B3 and B4 are isomorphic.
  2. The row components of both cell references x and y are absolute, and their cell reference row components are equal. For example:
     a. cell B5 contains an argument that references cell B$1, with row component $1;
     b. cell C5 contains an argument that references cell C$1, with row component $1;
  thus, the row components of the references in cells B5 and C5 are isomorphic.

FIGS. 2A and 2B show an example in which the formulas in cells B2:C3 are isomorphic. The formula in the cell at position B2 is

=$*A*$1+$*A*2+*B*1

The example formula in cell B2 contains three cell references, $A$1, $A2, and B1, and the formula evaluates to the sum of the values of the addressed cells.
  a. $A$1 references the cell A1 (absolute addressing: absolute column, absolute row)
  b. $A2 references the cell A2, (mixed addressing: absolute column, relative row)
  c. B1 references the cell B1, directly above B2 (relative addressing: relative column, relative row)

A formula block is a set of cells, typically covering a contiguous column, row, or rectangular area, in which the user intends that all cells are formula cells and that all of them are isomorphic. If all formula cells within a formula block are isomorphic, the formula block is a valid formula block. In the example in FIG. 2A, cells B2: C3 constitute a valid formula block.

EXAMPLES a. a valid column formula block: B2, B3, B4, containing formulas=A2+1, =A3+1, =A4+1.
b. a valid row formula block: B2, C2, D2, containing formulas=B1+1, =C1+1, =D1+1.
c. a valid rectangular formula block B2:C3, containing formulas=A2+B1, B2+C1 (cols B & C in row 2) A3+B2, B3+C2 (cols B & C in row 3).

Bugs in spreadsheet formulas are a very common problem for several reasons:

1. Problem: After a user changes a formula in one of the cells in a formula block, the user might forget to copy the changed formula to all other cells in the formula block. A conventional workaround is to ensure that all formulas in a formula block are isomorphic; in doing this, a user might unnecessarily copy formula cells, just to be sure. As can be appreciated, such a workaround is tedious.

2. Problem: After a user changes a formula cell in a formula block, the user might accidentally copy the changed formula cell to only some of the other cells in the formula block or to cells outside the formula block, or both. There is no good workaround to this problem.

3. Problem: To see if all formulas within a formula block are isomorphic, a user must carefully examine the formula in each formula cell in the formula block. There is no good workaround to this problem.

The disclosed ditto function addresses the above-noted deficiencies in conventional spreadsheet application programs. The disclosed ditto function takes a cell reference as argument. For example, =ditto(B2)A ditto cell is a cell containing a ditto function. To execute a first ditto cell, the system 101 acts as if a second cell, referenced by the argument to the ditto function in the first cell, had been copied to the first cell with a transposing copy. Thus, the first ditto cell is always isomorphic to the second cell it references, no matter how the formula in the second cell is modified.

A ditto block is a valid formula block filled by:

a. one main formula cell, typically the top cell of a column formula block, the left cell of a row formula block, or the upper left corner cell of a rectangular formula block
b. one or more ditto cells that reference the main formula cell and are thus isomorphic to it In FIG. 2C, the cells B2, B3, C2, and C3 form a ditto block. The ditto block's main formula cell is B2. The valid ditto block in FIG. 2C produces the same results as the valid formula block in FIG. 2A and generates the same results, shown in FIG. 2B.

In FIG. 2D, the cells B2, B3, C2, and C3 form a ditto block. An absolute cell reference can be accomplished by assigning a name to the cell to be referenced and then referencing the cell by name in the argument to the ditto function. In FIG. 2D, cell A1 has been given the name amt and is referenced by that name in cell B2, as the argument to the ditto function. The values of ditto cells B3, C2, and C3 are unaffected by the use of the name in the main formula cell in cell B2, to which they refer.

In one embodiment, the disclosed spreadsheet application 102 program may incorporate two functions that can be called: dittoCol( ) dittoRow( ) When invoked in a formula referenced ultimately from a ditto cell these functions return, respectively, •the column distance from the ditto cell to the cell referenced by the ditto cell's argument, and •the row distance from the ditto cell to the cell referenced by the ditto cell's argument. When invoked otherwise, they return 0.

Problems solved by the disclosed ditto function, which may take the form of a built-in function in a spreadsheet application program 101:

1. After a user changes a formula cell used by a ditto block, cell copying is unnecessary, so there is nothing more that the user must remember to do.
2. After a user changes a formula cell used by a ditto block, cell copying is unnecessary, so the user cannot accidentally copy the formula cell to too few cells within the formula block.
3. After a user changes a formula cell used by a ditto block, cell copying is unnecessary, so the user cannot accidentally copy the formula cell to cells outside the formula block.
4. To see if all formulas within a ditto block are isomorphic, a user can quickly and easily verify visually that all ditto cells are the same because they all have the same cell reference argument.

Some existing systems have two modes for viewing/interacting with a sheet:

Values View—the user sees the sheet's individual cells, exhibiting their values (FIG. 2B)
Formulas View—the user sees the sheet's individual cells, exhibiting their formulas, each usually only partially visible for lack of room. (FIG. 2A)

The system 101 may also include a Formula Block Highlighting option that highlights each formula block to distinguish it from other formula blocks and from cells not in formula blocks. As shown in FIG. 3A, when the Formula Block Highlighting option is selected and the system 101 is displaying Formulas View, only the main formula is shown in the formula block, and as much as possible of the formula is shown within the formula block. In the embodiment shown in FIG. 3A, the individual cells in the formula block are not shown. In another embodiment, the individual cells may be shown. If the formula warrants, in addition to using more horizontal space, the formula can use more vertical space (not shown).

Problems solved by Formula Block Highlighting: to see if all formulas within a formula block are isomorphic, a user can use the Formula Block Highlighting feature to quickly and easily verify visually that all cells in the formula block are part of the same highlighted area.

In some spreadsheet applications where we speak of a "sheet", the application would use the term "table". An example is the Numbers® spreadsheet from Apple Inc.

Other features of the disclosed embodiments may include the following. The system 101 can offer to detect a set of cells that are isomorphic and to designate the set of cells as a formula block. The system can offer to convert a formula block to an equivalent ditto block. The system 101 can implement the Formula block Highlighting option on formula blocks as well as ditto blocks. The system 101 can flag a formula block that is not fully using the ditto function. The system 101 can flag a formula block that appears to have errors. The system 101 allows a user to designate a formula block, whether it's valid or not. The system 101 offers a Paste Ditto operation, which creates a ditto cell rather than doing a transposing copy. The system 101 can replicate a formula or a ditto cell via a Fill Down or other similar command or via a drag-fill gesture to create ditto cells referring to the main formula of a formula block. The system 101 flags as an error or warning a valid formula block that contains more than one non-ditto formula cell.

The ditto cells in the figures are shown with relative cell references. Relative cell references are easier on the eye, as they are not cluttered with dollar signs. Unlike the usual behavior of a transposing copy, a transposing copy of a ditto cell preserves the same cell reference, whether it is relative, absolute, or mixed.

Figure 4:
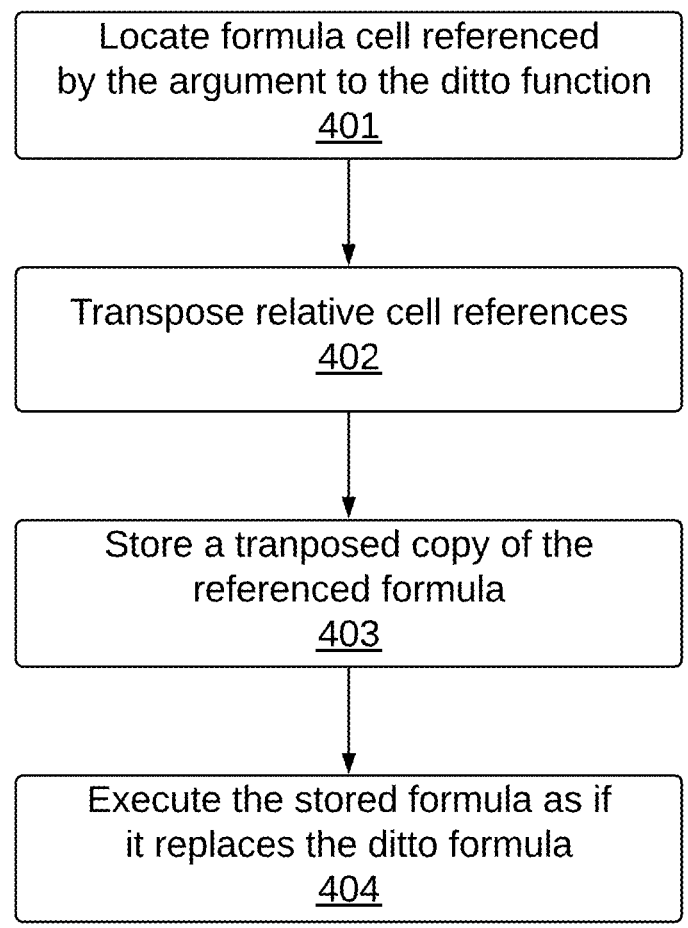
FIG. 4 is a flowchart illustrating an embodiment of evaluation of a cell having a ditto function.

FIG. 4 is a flowchart illustrating an embodiment of evaluation of a cell having a ditto function. The spreadsheet application program 102 for each cell containing a ditto function, locates, at 401, the formula cell referenced by the argument to the ditto function. Next, at 402, the spreadsheet application program 102 transposes the relative cell references, such as explained in connection with FIG. 2A. For example, with reference to FIG. 2A, cell B2 is transposed to generate cell B3, where reference B1 in cell B2 is transposed to generate references to cell B2 in cell B3, and cell C1 in cell C2, and cell C2 in cell C3. At 403, the spreadsheet application program 102 stores a translated copy of the referenced formula. At 403, the spreadsheet application program 102 executes the stored formula as if it replaces the ditto formula.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "computer system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

Figure 5:
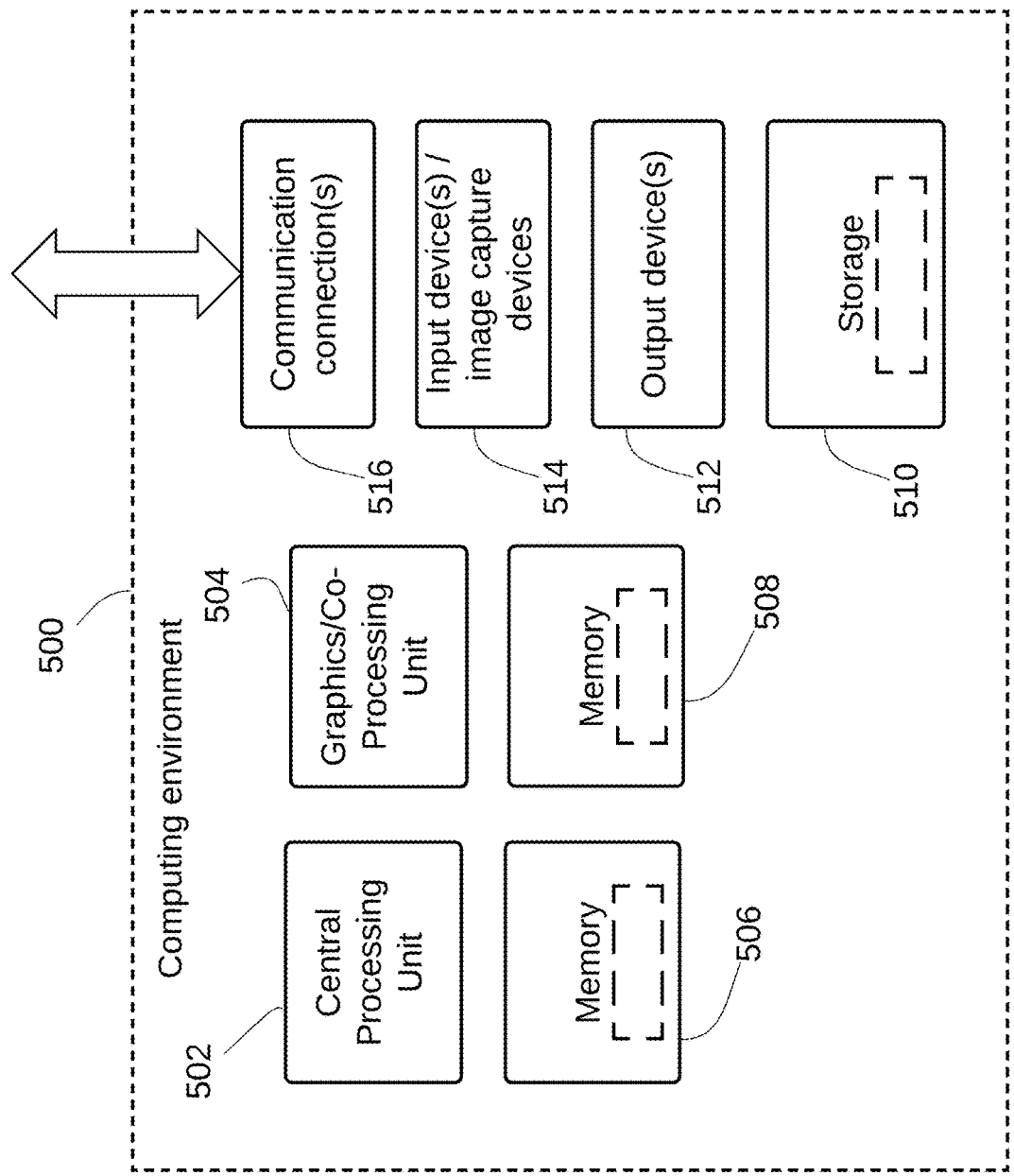
FIG. 5 is a block diagram of computer hardware that may be employed in certain embodiments of computer systems.

FIG. 5 is a block diagram of computer hardware that may be employed in certain embodiments of computer systems described herein, such as computer system 101. With reference to FIG. 5 the computing system 101 includes one or more processing units 502, 504 and memory 506, 508. The processing units 502, 504 execute computer-executable instructions. A processing unit can be a general-purpose central processing unit (CPU), processor in an application-specific integrated circuit (ASIC) or any other type of processor. The tangible memory 506, 508 may be volatile memory (e.g., registers, cache, RAM), non-volatile memory (e.g., ROM, EEPROM, flash memory, etc.), or some combination of the two, accessible by the processing unit(s). The hardware components in FIG. 5 may be standard hardware components, or alternatively, some embodiments may employ specialized hardware components to further increase the operating efficiency and speed with which the computer system 101 operates.

Computing system 101 may have additional features such as for example, storage 510, one or more input devices 514, one or more output devices 512, and one or more communication connections 516. An interconnection mechanism (not shown) such as a bus, controller, or network interconnects the components of the computing system 101. Typically, operating system software (not shown) provides an operating system for other software executing in the computing system 101, and coordinates activities of the components of the computing system 101.

The tangible storage 510 may be removable or non-removable, and includes flash memory, magnetic disks, magnetic tapes or cassettes, CD-ROMs, DVDs, or any other medium that can be used to store information in a non-transitory way and that can be accessed within the computing system 101. The storage 510 stores instructions for the software implementing one or more innovations described herein.

The input device(s) 514 may be a touch input device such as a keyboard, mouse, pen, or trackball, a voice input device, a scanning device, or another device that provides input to the computing system 10. For video encoding, the input device(s) 514 may be a camera, video card, TV tuner card, or similar device that accepts video input in analog or digital form, or a CD-ROM or CD-RW that reads video samples into the computing system 101. The output device(s) 512 may be a monitor, printer, speaker, CD-writer, or another device that provides output from the computing system 101.

The communication connection(s) 516 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

It should be understood that functions/operations shown in this disclosure are provided for purposes of explanation of operations of certain embodiments. The implementation of the functions/operations performed by any particular module may be distributed across one or more systems and computer programs and are not necessarily contained within a particular computer program and/or computer system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer system executing a set of instructions that when executed provide to a user a spreadsheet application that accepts inputs from the user to enter data and one or more formulas in cells in a spreadsheet document, the spreadsheet application encoded with computer executable instructions that when executed cause the computer system to:

accept from the user a ditto function in a first cell of the spreadsheet document, an argument in the ditto function referencing a second cell;

accept from the user a formula in the second cell of the spreadsheet document, the formula comprising a function with one or more arguments, including one or more relative arguments, each relative argument in the formula referring to a cell in the spreadsheet document that is positioned a relative distance from the second cell;

evaluate the ditto function in the first cell to cause the first cell to calculate its result value by evaluating the formula of the second cell where each argument in the formula of the second cell is transposed to be relative to the first cell;

where a transposed argument has a relative distance from the first cell that is the same as the relative distance of the corresponding argument in the second cell from the second cell.

2. The computer system of claim 1 where transposition of relative arguments causes the first and second cells to be isomorphic and wherein the spreadsheet application is further encoded with computer executable instructions that when executed cause the computer system to:
    accept from the user an input to highlight a formula block of cells in the spreadsheet document, wherein the formula block of cells in the spreadsheet document comprises a set of cells that are isomorphic;
    where isomorphic cells are cells that calculate as the same formula but with relative arguments calculated with respect to each cell; and
    adjust visual rendering of cells in the formula block to cause cells in the formula block to be highlighted to the user.

3. The computer system of claim 2 wherein the spreadsheet application is further encoded with computer executable instructions that when executed cause the computer system to:
    accept from the user an input to display cells in the spreadsheet document in a formula view where only one cell in the formula block with a formula contained therein is displayed to the user with the formula visible in the cell.

4. The computer system of claim 2 wherein the spreadsheet application is further encoded with computer executable instructions that when executed cause the computer system to:
    accept from the user an input to display cells in the spreadsheet document in a data view where the result values of cells are displayed.

5. The computer system of claim 1 wherein the spreadsheet application is further encoded with computer executable instructions that when executed cause the computer system to:
    accept inputs from the user to cause highlighting of a formula block to distinguish the formula block in the spreadsheet document visually from other formula blocks and from other cells not in formula blocks.

6. The computer system of claim 1 wherein the spreadsheet application is further encoded with computer executable instructions that when executed cause the computer system to:
    accept from the user an input included in the formula in the second cell, a ditto column function that returns a column distance; and
    process the ditto column function by returning a column distance between the first cell and the second cell, where a formula using the ditto column function is being evaluated.

7. The computer system of claim 1 wherein the spreadsheet application is further encoded with computer executable instructions that when executed cause the computer system to:
    accept from the user an input included in the formula in the second cell, a ditto row function that returns a row distance; and
    process the ditto row function by returning a row distance between the first cell and the second cell, where a formula using the ditto row function is being evaluated.

8. A method, implemented by one or more processors, to provide to a user a spreadsheet application that accepts inputs from the user to enter data and one or more formulas in cells in a spreadsheet document, the method comprising the operations of:
    accepting from the user a ditto function in a first cell of the spreadsheet document, an argument in the ditto function referencing a second cell;
    accepting from the user a formula in the second cell of the spreadsheet document, the formula comprising a function with one or more arguments, including one or more relative arguments, each relative argument in the formula referring to a cell in the spreadsheet document that is positioned a relative distance from the second cell;
    evaluating the ditto function in the first cell to cause the first cell to calculate its result value by evaluating the formula of the second cell where each argument in the formula of the second cell is transposed to be relative to the first cell;
    where a transposed argument has a relative distance from the first cell that is the same as the relative distance of the corresponding argument in the second cell from the second cell.

9. The method of claim 8 where transposition of relative arguments causes the first and second cells to be isomorphic and wherein the method comprises the further operations of:
    accepting from the user an input to highlight a formula block of cells in the spreadsheet document, wherein the formula block of cells in the spreadsheet document comprises a set of cells that are isomorphic;
    where isomorphic cells are cells that calculate as the same formula but with relative arguments calculated with respect to each cell; and
    adjusting visual rendering of cells in the formula block to cause cells in the formula block to be highlighted to the user.

10. The method of claim 9 comprising the further operations of:
    accepting from the user an input to display cells in the spreadsheet document in a formula view where a only one cell in the formula block with a formula contained therein is displayed to the user with the formula visible in the cell.

11. The method of claim 8 comprising the further operations of:
    accepting inputs from the user to cause highlighting of a formula block to distinguish the formula block in the spreadsheet document visually from other formula blocks and from other cells not in formula blocks.

12. The method of claim 8 comprising the further operations of:
    accepting from the user an input included in the formula in the second cell, a ditto column function that returns a column distance; and
    processing the ditto column function by returning a column distance between the first cell and the second cell, where a formula using the ditto column function is being evaluated.

13. The method of claim 8 comprising the further operations of:
    accepting from the user an input included in the formula in the second cell, a ditto row function that returns a row distance; and
    processing the ditto row function by returning a row distance between the first cell and the second cell, where a formula using the ditto row function is being evaluated.

14. The method of claim 8 comprising the further operations of:
    accepting from the user an input to display cells in the spreadsheet document in a data view where the result values of cells are displayed.

15. A computer program product for providing to a user a spreadsheet application that accepts inputs from the user to enter data and one or more formulas in cells in a spreadsheet document, the computer program product stored on a non-transitory computer readable storage medium and including instructions for causing one or more processors to execute a method comprising the operations of:
    accepting from the user a ditto function in a first cell of the spreadsheet document, an argument in the ditto function referencing a second cell;
    accepting from the user a formula in the second cell of the spreadsheet document, the formula comprising a function with one or more arguments, including one or more relative arguments, each relative argument in the formula referring to a cell in the spreadsheet document that is positioned a relative distance from the second cell;
    evaluating the ditto function in the first cell to cause the first cell to calculate its result value by evaluating the formula of the second cell where each argument in the formula of the second cell is transposed to be relative to the first cell;
    where a transposed argument has a relative distance from the first cell that is the same as the relative distance of the corresponding argument in the second cell from the second cell.

16. The computer program product of claim 15 where transposition of relative arguments causes the first and second cells to be isomorphic and wherein the method executed comprises the further operations of:
    accepting from the user an input to highlight a formula block of cells in the spreadsheet document, wherein the formula block of cells in the spreadsheet document comprises a set of cells that are isomorphic;
    where isomorphic cells are cells that calculate as the same formula but with relative arguments calculated with respect to each cell; and
    adjusting visual rendering of cells in the formula block to cause cells in the formula block to be highlighted to the user.

17. The computer program product of claim 16 wherein the method executed comprises the further operations of:
    accepting from the user an input to display cells in the spreadsheet document in a formula view where a only one cell in the formula block with a formula contained therein is displayed to the user with the formula visible in the cell.

18. The computer program product of claim 15 wherein the method executed comprises the further operations of:
    accepting inputs from the user to cause highlighting of a formula block to distinguish the formula block in the spreadsheet document visually from other formula blocks and from other cells not in formula blocks.

19. The computer program product of claim 15 wherein the method executed comprises the further operations of:
    accepting from the user an input included in the formula in the second cell, a ditto column function that returns a column distance; and
    processing the ditto column function by returning a column distance between the first cell and the second cell, where a formula using the ditto column function is being evaluated.

20. The computer program product of claim 15 wherein the method executed comprises the further operations of:
    accepting from the user an input included in the formula in the second cell, a ditto row function that returns a row distance; and
    processing the ditto row function by returning a row distance between the first cell and the second cell, where a formula using the ditto row function is being evaluated.

\* \* \* \* \*